Oct. 18, 1938.                E. FRIES                2,133,919

ALTERNATING CURRENT ARC-WELDING TRANSFORMER

Filed March 4, 1936

Fig. 4ᴬ

Inventor
Edward Fries
By
Atty.

Patented Oct. 18, 1938

2,133,919

UNITED STATES PATENT OFFICE 2,133,919

ALTERNATING CURRENT ARC-WELDING TRANSFORMER

Eduard Fries, Oerlikon, Switzerland

Application March 4, 1936, Serial No. 67,159
In Germany March 9, 1935

10 Claims. (Cl. 171—119)

This invention relates to A. C. arc welding transformers in which the no-load voltage for starting and maintaining the arc must be varied in accordance with the intensity of the welding current.

In addition welding transformers should permit adjustment of the welding current from for instance, 15 up to about 220 amperes, that is to say, in the ratio of 1:10 to 1:15.

The welding transformers at present known are provided with taps for the adjustment of the welding voltages and currents within the above mentioned limits. For different welding operations the connections must be shifted to the taps which give the required voltage or current. For reason of simplicity only two no-load taps are provided. The capacity of the transformer is the product of the no-load tension and the welding current.

Other transformers are known which are provided with a number of secondary coils adapted to be connected together either in series or in parallel in order to thereby change the characteristic. Also, these transformers, however, present many inconveniences and do not permit of a stepless or continuous regulation of the no-load voltage.

In order to overcome these inconveniences and to obtain a continuous regulation of the current for starting and maintaining the welding arc without the use of taps on the secondary winding, I have devised a transformer design which meets the following requirements:

a. Possibility of obtaining automatically and continuously and without taps, the most appropriate no-load voltages ranging from 60 v. for the currents of greatest intensity to about 90 v. for the smallest currents.

b. By working with substantially lower voltages in the secondary winding of the transformer, the absorbed apparent power is correspondingly less and a smaller transformer may be employed.

c. Practically complete elimination of the vibration of the iron sheets forming the core and consequently elimination of the hum.

These requirements, which are indispensable for a good industrial transformer, are not found to my knowledge and belief in any of the former transformers.

In practice I have found that a reliable welding transformer should meet the following requirements:

a. The transformer core must be provided with an auxiliary movable limb or core which must be connected to the fixed part by an antivibration connection and must be such as to provide a path the reluctance of which is variable in a continuous stepless manner within a predetermined range, in order to produce a regulation of the no-load voltage in accordance with the known requirements of A. C. arcs. These latter requirements are attained either by suitably shaping the pole faces which define a variable air gap preferably so as to differ from a geometrical plane, and/or by bridging the air gap by means of a magnetizable core of reduced section.

b. By placing around the variable magnetic resistance an auxiliary coil, which is connected in series with the secondary winding of the transformer so that a variable amount of additional voltage is induced in the auxiliary coil at no-load;

The annexed drawing shows several embodiments of the invention.

Figure 4 is a prospective view of a transformer core showing another embodiment of a core for shunting the air gap and Figure 4a is an elevation of the case transformer showing the position of the coils on the core;

Figure 1:
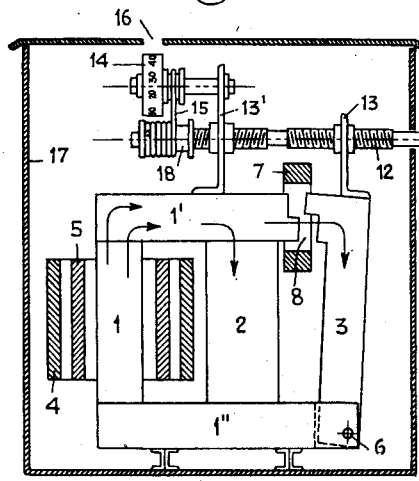
Figure 1 is a diagrammatical view partially in section of an A. C. arc welding transformer provided with a main and an auxiliary magnetic circuit including a variable air gap encircled by an auxiliary coil.

In Figure 1, the numeral 1 designates the main limb of the arc welding transformer integral with the yokes 1' and 1", 4 is the primary winding and 5 the secondary winding both arranged on limb 1. Between the yokes 1' and 1" is arranged an intermediate limb 2 on which no coils are arranged. To the end of one of the yokes, 1", a movable limb 3 is hinged at 6. An auxiliary coil is arranged about the air gap 8.

When the transformer is energized with the secondary circuit open a magnetic flux is generated between limb 1 and yokes 1' and 1", the magnetic circuits being completed through limbs 2 and 3 as indicated by the arrows, the magnetic fluxes being inversely proportional to the magnetic resistance of the two circuits. The secondary winding 5 is connected in series with the auxiliary coil 7, so that the magnetic flux passing from limb 1 through limb 3 induces an additional voltage in the auxiliary coil 7 at no-load which is added to the voltage of the secondary winding 5, thereby facilitating the starting of the arc and improving its stability. By reducing the air gap 8, that part of the magnetic flux generated within limb 1 which passes through limb 3 is increased and consequently also the supplemental voltage induced within auxiliary coil 7 is increased. In order to avoid a substantial leakage of the auxiliary flux and to provide the desired no-load voltage adjustment the pole faces forming the air gap are preferably step shaped.

It is to be noted that the regulation is greatly influenced by the shape of the pole faces which define the gap, which means that the value of the supplementary voltage induced within coil 7, depends also upon the shape of the said pole faces.

During the welding the direction of the flux in limb 3 is reversed and the auxiliary flux is returned through limb 2, which therefore must be so dimensioned as to allow the passage during the welding of the sum of the magnetic fluxes of the limb 1 and of the limb 3. As the magnetic flux traversing the limb 3 at no-load is desired and useful, the air gap in case of low welding currents may be reduced to zero.

From the foregoing it is apparent that the transformer according to the invention permits of varying the welding current within the widest limits without the use of taps.

Figure 2:
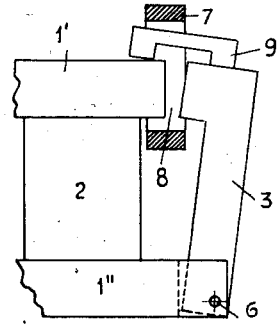
Figure 2 is a partial diagrammatical view of a part of a transformer core provided with a variable air gap, which is bridged by a magnetizable shunt of reduced section.

Figure 2 shows another embodiment of the part of the transformer core including the movable limb 3. According to this embodiment the air gap 8 is bridged by a small laminated core 9, which is so dimensioned as to shunt the air gap and permit the flow of a magnetic flux of substantially constant value to pass through the limb 3 thereby generating in the coil 7 a supplementary voltage which may be as much as 20% of the secondary voltage. This permits of a reduction of about 20% the size of the transformer including the auxiliary coil and the absorbed apparent output is correspondingly smaller. The bridge 9 naturally also affects the regulation of the welding current, but only to a limited extent, provided, however, that the bridge 9 is so dimensioned as to become already highly saturated when the magnetic flux passing therethrough reaches a value of say about 20% of the normal flux traversing the limb 3. The bridge 9 is, therefore, preferably made of a material presenting a high magnetic permeability and very definite limit of saturation, as for instance the alloy known under the registered name "Permalloy". Of course, besides the constant no-load magnetic flux which traverses the bridge 9 when the transformer is energized at no-load, a variable magnetic flux component which is inversely proportional to the varying reluctance of the air gap passes through the latter. The same results could also be obtained by other structural means.

It should also be mentioned that it is possible to vary the flux traversing the air gap 8 by varying the magnetic resistance of the limb 2.

Figure 3:
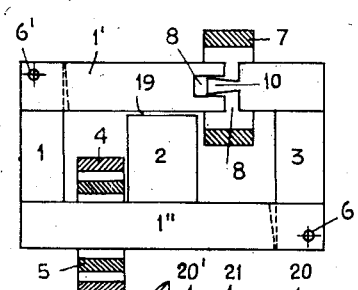
Figure 3 is another modification of a transformer core provided with two variable air gaps and showing in addition a modified arrangement of the transformer coils.

This is conveniently effected by providing an additional air gap in the member 2 of the transformer, as shown by way of example in Figure 3. The transformer that is similar to that shown in Figure 1, has its yoke 1' hinged to the limb 1 and the shiftable limb 3 hinged as in the other cases to the end of yoke 1". Between the end of limb 2 and the opposing ends of yoke 1' is arranged a supplementary air gap 19. The air gap 8 is bridged by a narrow core projection 10 slidably fitting within a corresponding slot of yoke 1'. By angular shifting of the limb 3 the air gap 8 is varied and in addition the projection 10 engages the recess of yoke 1' and rotates the latter, thereby producing a variation of the air gap 19.

As further shown in Figure 3, the primary and secondary windings 4 and 5 may be arranged on the yoke 1' or they may be arranged on the yoke 1", while the auxiliary coil 7 is preferably arranged around air gap 8.

Figure 4:
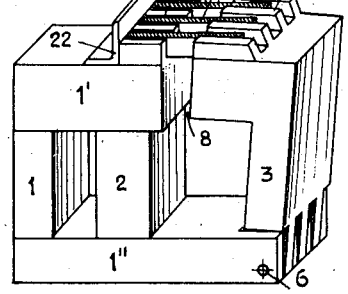

Figures 4 also 4a show a modified form of the adjustable zone of variable reluctance of the transformer core, which is effected by extending some of the laminations of the transformer in proximity of the air gap 8 substantially at right angle of the latter so as to form therebetween grooves 20 and 20', respectively. Adjacent to the rear end of the projections of yoke 1' is mounted an angle iron 22. Laminated cores 21 are inserted in the grooves 20' and welded to the angle iron 22. The outer parts of these cores project across air gap 8 into grooves 20 in which they are fitted with a sliding fit.

The arrangement of the other parts is like that shown in Figure 1.

Figure 5:
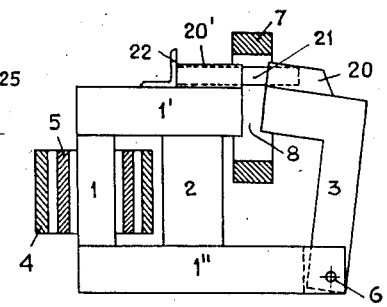
Figure 5 is a diagrammatical view of a transformer for three-phase current.

Although the invention has been heretofore described in connection with single-phase transformers, the aforesaid applies also to the polyphase transformers. Figure 5 shows a transformer adapted for three-phase supply and Figure 6 illustrates the connections of the transformer, which is of the Scott type and in which the primary windings 4—4' are star-connected and the secondary windings 5—5' are connected in series with each other and with the auxiliary coil 7 across the welding electrode.

The transformer shown in Figure 5 is substantially like a single-phase transformer, the only difference being that for the use of the three-phase current a second main limb 23 is provided and equipped with primary and secondary windings like limb 1.

During no-load the limb 2 is traversed by the resultant magnetic flux of the two limbs 1 and 23 which flux is therefore composed by two magnetic fluxes which are 90° displaced from each other. A portion of this resulting magnetic flux passes though air gap 8 and limb 3 generating in the auxiliary coil 7 a supplemental voltage which is in phase with the secondary voltage.

Figure 6:
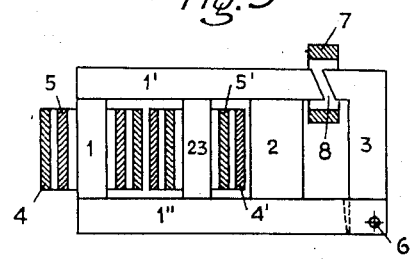
Figure 6 is a diagram of the electric connection and windings of the transformer shown in Fig. 5, and Figures 7 to 9 show a preferred embodiment of antivibrating connection of the movable core of the transformer core.

In the arrangement illustrated in Figure 6 all three phases of the primary circuit supply current. These currents as well as the phase displacements are unequal. However, by means of condensers this lack of symmetry can be equalized to a large extent.

Figures 7, 9:
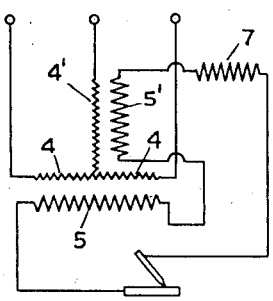
Figure 8:
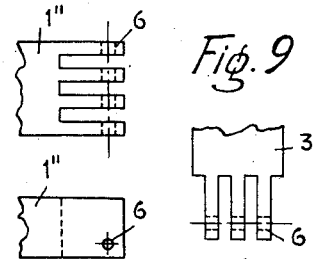

In order to avoid vibration of the movable limb 3, and eventually of yoke 1', of Figure 3, these parts may be hinged as shown in Figures 7 to 9.

Figure 7 represents a plan view of the end of the lower yoke 1", Figure 8 is an elevation and Figure 9 a side view of the lower end of the limb 3. As shown in the drawing, the ends of the two parts to be hinged together are slotted so as to form dovetailed joints connected by a pivot pin 6.

The adjustment of the limb 3 may be effected for instance by means of the device shown in Figure 1, comprising a spindle 12 having a right and left hand thread, the threaded part being screwed into threaded bushings 13, 13', which are in turn fastened to yoke 1' and to limb 3 respectively. Each position of the movable limb 3 corresponds to a certain welding current or electrode diameter. These current intensities may be inscribed on a scale of a drum 14 which may be rotated by means of a band 15 connected to the said drum 14 and to a winding drum 18 fitted to the spindle 12 respectively. The whole device is mounted inside of a casing 17 provided with an opening 16. The spindle 12 projects through this casing 17 and is provided with a handwheel 25. By rotating this handwheel the air gap 8 is adjusted and the corresponding welding current intensities may be read on the drum 14 through the opening 16.

I claim:

1. In a transformer, in combination, a substantially U-shaped iron core, an iron member of relatively high permeance arranged to form a substantially continuous ferro-magnetic loop with said core, a second substantially U-shaped ferro-magnetic core having interposed therein a zone of reduced permeability, said second core being arranged relative to said first loop in magnetic shunt with said member and forming therewith a second magnetic loop, primary and secondary windings on said first core, and an auxiliary winding encircling said zone and connected in series with said secondary windings to cause the voltage induced therein by that part of the primary flux which is shunted through the second core to be added to the voltage induced in said secondary windings.

2. In a transformer, in combination, a substantially U-shaped iron core, an iron member of relatively high permeance arranged to form a substantially continuous ferro-magnetic loop with said core, a second substantially U-shaped ferro-magnetic core having interposed therein a zone of reduced permeability, said second core being arranged relative to said first loop in magnetic shunt with said member and forming therewith a second magnetic loop, primary and secondary windings on said first core, and an auxiliary winding encircling said zone and connected in series with said secondary windings to cause the voltage induced therein by that part of the primary flux which is shunted through said second core to be added to the voltage induced in said secondary windings and further to cause the flux induced in said second loop by the current in said auxiliary coil to pass through said member in the same direction as the magnetic flux induced by the primary current in said first loop.

3. In a transformer, in combination, a substantially U-shaped iron core, an iron member of relatively high permeance arranged to form a substantially continuous ferro-magnetic loop with said core, a second substantially U-shaped ferro-magnetic core having interposed therein an adjustable zone of reduced permeability, said second core being arranged relative to said first loop in magnetic shunt with said member to form therewith a second magnetic loop, means to vary the permeability of said zone, primary and secondary windings on said first core, and an auxiliary winding encircling said zone and connected in series with said secondary winding to cause the voltage induced therein by that part of the primary flux which is shunted though the second core to be added to the voltage induced in said secondary winding.

4. In a transformer, in combination, a substantially U-shaped iron core, an iron member of relatively high permeance arranged to form a substantially continuous ferro-magnetic loop with said core, a second substantially U-shaped ferro-magnetic core having interposed therein an adjustable zone of reduced permeability comprising, an air gap which is bridged by an iron shunt of relatively high permeability at low flux densities in said second core and of relatively low permeability at high flux densities in said second core, said second core being arranged relative to said first loop in magnetic shunt with said member to form therewith a second magnetic loop, primary and secondary windings on said first core, and an auxiliary winding encircling said zone and connected in series with said secondary windings to cause the voltage induced therein by that part of the primary flux which is shunted through the second core to be added to the voltage induced in said secondary windings.

5. In a transformer, in combination, a substantially U-shaped iron core, an iron member of relatively high permeance arranged to form a substantially continuous ferro-magnetic loop with said core, a second substantially U-shaped ferro-magnetic core having interposed therein an adjustable zone of reduced permeability comprising an air gap which is bridged by a shunt having the magnetic chracteristics of "Permalloy", said second core being arranged relative to said first loop in magnetic shunt with said member and forming a second magnetic loop therewith, primary and secondary windings on said first core, and an auxiliary winding encircling said zone and connected in series with said secondary windings to cause the voltage induced therein by that part of the primary flux which is shunted through the second core to be added to the voltage induced in said secondary windings.

6. In a transformer, in combination, a substantially U-shaped iron core, an iron member of relatively high permeance arranged to form a ferro-magnetic loop with said core which is continuous but for a relatively short air gap interposed therein outside of said core, a second substantially U-shaped ferro-magnetic core having interposed therein a zone of reduced permeability, said second core being arranged relative to said first loop to shunt said member and to form therewith a second magnetic loop, primary and secondary windings on said first core, and an auxiliary winding encircling said zone and connected in series with said secondary windings to cause the voltage induced therein by that part of the primary flux which is shunted through the second core to be added to the voltage induced in said secondary windings.

7. In a transformer, in combination, a substantially U-shaped iron core, an iron member arranged to form a substantially continuous ferro-magnetic loop with said core, a second substantially U-shaped ferro-magnetic core having interposed therein a zone of reduced permeability, said second core being arranged relative to said first loop in magnetic shunt with said member and forming a second magnetic loop therewith, the cross sectional area of said member being substantially equal to the sum of the cross sections of said cores, primary and secondary windings on said first core, and an auxiliary winding encircling said zone and connected in series with said secondary windings to cause the voltage induced therein by that part of the primary flux which is shunted through the second core to be added to the voltage induced in said secondary windings.

8. In a transformer, in combination, a substantially U-shaped iron core, an iron member of relatively high permeance arranged to form a substantially continuous ferro-magnetic loop with said core, a second substantially U-shaped ferro-magnetic core having interposed therein a zone of reduced permeability comprising, an adjustable air gap arranged between relatively movable interengaging longitudinal projections and recesses integral with said frame and at opposite ends of said zone respectively, said second core being arranged relative to said first loop in magnetic shunt with said member and forming a second magnetic loop therewith, primary and secondary windings on said first core, and an auxiliary winding encircling said zone and connected in series with said secondary windings to cause the voltage induced therein by that part of the primary flux which is shunted through the second core to be added to the voltage induced in said secondary windings.

9. In a transformer, in combination, a substantially U-shaped iron core, an iron member of relatively high permeance arranged to form a substantially continuous ferro-magnetic loop with said core, a second substantially U-shaped ferro-magnetic core having interposed therein a zone of reduced permeability, comprising, an adjustable air gap shunted by relatively movable interengaging longitudinal projections and recesses integral with said frame and attached to said second core at opposite ends of said core respectively, to form a shunt for said air gap, said second core being arranged relative to said first loop in magnetic shunt with said member and forming a second magnetic loop therewith, primary and secondary windings on said first core, and an auxiliary winding encircling said zone and connected in series with said secondary windings to cause the voltage induced therein by that part of the primary flux which is shunted through the second core to be added to the voltage induced in said secondary windings.

10. In a transformer, in combination, a plurality of substantially U-shaped iron cores, an iron member of relatively high permeance arranged to form substantially continuous ferromagnetic loops with said cores, an auxiliary substantially U-shaped ferro-magnetic core having interposed therein a zone of reduced permeability, said auxiliary core being arranged relative to said first loops in magnetic shunt with said member and forming therewith an auxiliary magnetic loop, primary and secondary windings on each of said plurality of cores, and an auxiliary winding encircling said zone and connected in series with said secondary windings to cause the voltage induced therein by the primary fluxes shunted through the auxiliary core to be added to the voltage resulting from said secondary windings.

EDUARD FRIES.